United States Patent [19]
Chen et al.

[11] Patent Number: 5,972,433
[45] Date of Patent: Oct. 26, 1999

[54] METHOD FOR TREATMENT OF METAL SUBSTRATES USING MANNICH-DERIVED POLYETHERS

[75] Inventors: Shih-Ruey Thomas Chen, Pittsburgh; Yi Jin Warburton, Moon Township, both of Pa.; Hong Ding, Darien, Ill.

[73] Assignee: Calgon Corporation, Pittsburgh, Pa.

[21] Appl. No.: 08/986,159

[22] Filed: Dec. 5, 1997

[51] Int. Cl.$^6$ ...................................................... B05D 7/16
[52] U.S. Cl. .................. 427/386; 427/388.1; 427/393.5; 427/409; 148/250; 148/253; 148/256; 148/257; 148/259; 148/260
[58] Field of Search ................................. 427/386, 388.1, 427/393.5, 409; 148/250, 253, 256, 257, 259, 260

[56] References Cited

U.S. PATENT DOCUMENTS

| | | |
|---|---|---|
| 3,494,889 | 2/1970 | Hairston et al. . |
| 3,994,989 | 11/1976 | Kempter et al. . |
| 4,001,155 | 1/1977 | Kempter et al. . |
| 4,014,955 | 3/1977 | Renner ...................................... 260/831 |
| 4,191,596 | 3/1980 | Dollman et al. . |
| 4,376,000 | 3/1983 | Lindert . |
| 4,396,732 | 8/1983 | Sekmakas et al. . |
| 4,433,015 | 2/1984 | Lindert . |
| 4,457,790 | 7/1984 | Lindert et al. . |
| 4,517,028 | 5/1985 | Lindert . |
| 4,952,732 | 8/1990 | Speranza et al. . |
| 5,039,310 | 8/1991 | Blain et al. . |
| 5,039,770 | 8/1991 | Lindert et al. . |
| 5,116,912 | 5/1992 | Lindert et al. . |
| 5,122,202 | 6/1992 | Dykstra et al. . |
| 5,266,410 | 11/1993 | Lindert et al. . |
| 5,298,289 | 3/1994 | Lindert et al. . |
| 5,324,347 | 6/1994 | Lawson . |
| 5,389,405 | 2/1995 | Purnell et al. . |
| 5,412,011 | 5/1995 | Morris et al. . |
| 5,451,431 | 9/1995 | Purnell et al. . |
| 5,523,363 | 6/1996 | Fujibayashi et al. . |

FOREIGN PATENT DOCUMENTS

| | | |
|---|---|---|
| 0 319 016 | 6/1989 | European Pat. Off. . |
| 0 469 203 A1 | 2/1992 | European Pat. Off. . |
| 0 639 627 A1 | 2/1995 | European Pat. Off. . |
| WO 93/09265 | 5/1993 | WIPO . |
| WO 95/28449 | 10/1995 | WIPO . |

*Primary Examiner*—Erma Cameron
*Attorney, Agent, or Firm*—Diane R. Meyers; Eckert Seamans Cherin & Mellott, LLC

[57] ABSTRACT

Methods for treating metal substrates are disclosed. These methods, which comprise contacting the surface to be treated with a composition comprising a Mannich-derivatized polyether, improve the corrosion resistance and/or adhesion properties of the treated surface. Similar methods for treating polymeric substrates are disclosed.

23 Claims, 1 Drawing Sheet

METHOD FOR TREATMENT OF METAL SUBSTRATES USING MANNICH-DERIVED POLYETHERS

BACKGROUND OF THE INVENTION

1. Field of the Invention

The present invention relates to methods for metal substrate treatment. More particularly, the present invention relates to methods for treatment of metal substrates with compositions comprising Mannich-derivatized polyethers. These methods provide improved corrosion resistance and/or paint adhesion properties to the metal substrate being treated.

2. Background Information

The present invention is directed to methods which are generally useful in the art of metal substrate treatment, particularly the treatment of phosphatized metal substrates, and more particularly the post-treatment of phosphatized metal substrates. Such treatment imparts improved corrosion resistance to the substrate, and improves the adhesion of final coating layers such as paints, inks, lacquers and plastics. The need for applying protective coatings to metal substrates for improved corrosion resistance and/or paint adhesion characteristics is well known in the art of metal finishing, as well as other metal arts. The usual technique for applying such protective coatings to metal substrates involves contacting a clean metal substrate with a solution containing phosphate and possibly other metal ions to form a corrosion resistant, nonreactive phosphate complex coating on the metal substrate. Because such coatings convert the metal substrate from a chemically active surface readily susceptible to oxidation to one having improved corrosion resistance and/or paint adhesion properties, they are known in the art as "conversion coatings".

The corrosion resistance and paint adhesion of conversion coatings can be further enhanced by treating the metal substrate with a post-treatment solution. Typical of such solutions are dilute aqueous acidic solutions containing a hexavalent chromium compound. Because of the toxic nature of hexavalent chromium compounds, however, expensive treatments must be used to remove chromates from effluent water to prevent the pollution of rivers, streams, drinking water sources, etc. Therefore, although chromium post-treatment solutions and processes are known to be effective, recent development efforts have been directed to discovering alternatives to chromium-containing compounds for post-treatment of conversion coatings.

U.S. Pat. No. 4,376,000 discloses processes for post-treating a phosphate-type conversion coated metal surface comprising contacting the surface with polyvinylphenol or its derivatives. U.S. Pat. Nos. 4,433,015 and 4,517,028 disclose aqueous compositions comprising polyvinylphenol and polyalkenylphenol derivatives and acid salts thereof, respectively; processes for treating a metal surface comprising contacting said surface with these aqueous compositions are also disclosed. U.S. Pat. No. 4,457,790 claims an aqueous solution comprising a metal ion and a polyvinylphenol derivative or acid salt thereof. A process for treating a metal surface comprising contacting said surface with the aqueous solution is also disclosed.

U.S. Pat. No. 5,523,363 relates to a resin obtained by reacting an epoxy resin, an amino compound and a phenol compound, and an epoxidized novolac-substituted phenolic resin. The resin is useful as an aqueous coating, particularly for cationic electrocoatings. There is no teaching of polymerizing the components, or of using the resin to treat metal or polymeric surfaces.

U.S. Pat. No. 5,298,289 discloses processes for treating certain plastic or painted surfaces with liquid surface treatment comprising water and a water soluble or dispersible polyphenol polymer which contains substituted aminomethyl groups on some of the phenyl rings of the polyphenol. Other polyphenol compounds useful in metal treatment are disclosed in U.S. Pat. Nos. 5,116,912, 5,039,770 and 5,266,410 and EPO 319 016.

U.S. Pat. No. 5,324,347 relates to a composition comprising a liquid solvent or dispersant or surface coating composition and a 2,6-bis(substituted aminomethyl)phenol. There is no teaching that the phenol be polymerized with an epoxy.

U.S. Pat. Nos. 5,389,405, 5,412,011 and 5,451,431 disclose aqueous solutions for coating a metal surface comprising a polymer, a silicate and an organofunctional silane. Methods of coating a metal surface comprising contacting said surface with the aqueous solutions are also disclosed.

WO 93/09265 discloses a treatment for the formation of a corrosion resistant film on metal surfaces. This treatment includes use of a phosphate surface-treatment bath containing a cationic organic polymeric compound having at least one cationic nitrogen atom. Disclosed as one of the polymeric compounds is the adduct of $HN(CH_3)_2$ with a bisphenol A epoxy resin.

European Patent Application 639,627 discloses aqueous solutions for pre-treating a metal surface, particularly aluminum, consisting essentially of an anionic polyacrylamide copolymer. A method of coating a metal surface which comprises contacting said surface with any of the aqueous solutions is also disclosed. Uses of other acrylate-containing compositions in treating aluminum are disclosed in U.S. Pat. Nos. 4,191,596 and 5,122,202.

U.S. Pat. No. 3,994,989 discloses a paint binder comprising the reaction product of a Mannich base and an epoxide resin containing at least one 1,2-epoxide group. U.S. Pat. No. 4,001,155 similarly discloses a paint binder for the cathodic electrocoating of electrically conductive metal surfaces comprising the reaction product of a Mannich base and an epoxide resin containing 1,2 epoxide groups. U.S. Pat. No. 4,396,732 discloses the Mannich base of an amine resin prepared by reacting a dihydric phenolic compound with a diepoxide. None of these reference, however, disclose the use of such resins as a sealing rinse in the treatment of metal or polymeric surfaces.

Mannich condensates of a substituted phenol and an alkylamine containing internal alkoxy groups are disclosed in European Patent Application 469,203.

There remains a very real and substantial need for chrome-free methods for treating various metal substrates, particularly phosphatized metal surfaces. The present invention addresses this need.

SUMMARY OF THE INVENTION

The present invention is directed to a method for treating various surfaces comprising contacting said surfaces with an effective amount of a composition comprising one or more Mannich-derived polyethers in a suitable solvent. These methods are particularly applicable to the post-treatment of a phosphate-type conversion coated metal surface. These methods utilize compositions comprising the product of the condensation polymerization of a Mannich-derivatized bisphenol resin and a difunctional monomer.

It is therefore an object of the invention to provide a method for treating a metal surface using a non-chromate formulation.

It is a further object of the invention to provide such a method using the product of the condensation polymerization of a bisphenol and a difunctional monomer.

Yet another object of the invention is to provide such a method that improves the corrosion resistance and/or paint adhesion characteristics of the metal surface being treated.

A further object of this invention is to provide a method for treating polymeric substrates using non-chromate formulations.

DETAILED DESCRIPTION OF THE INVENTION

Figure 1:
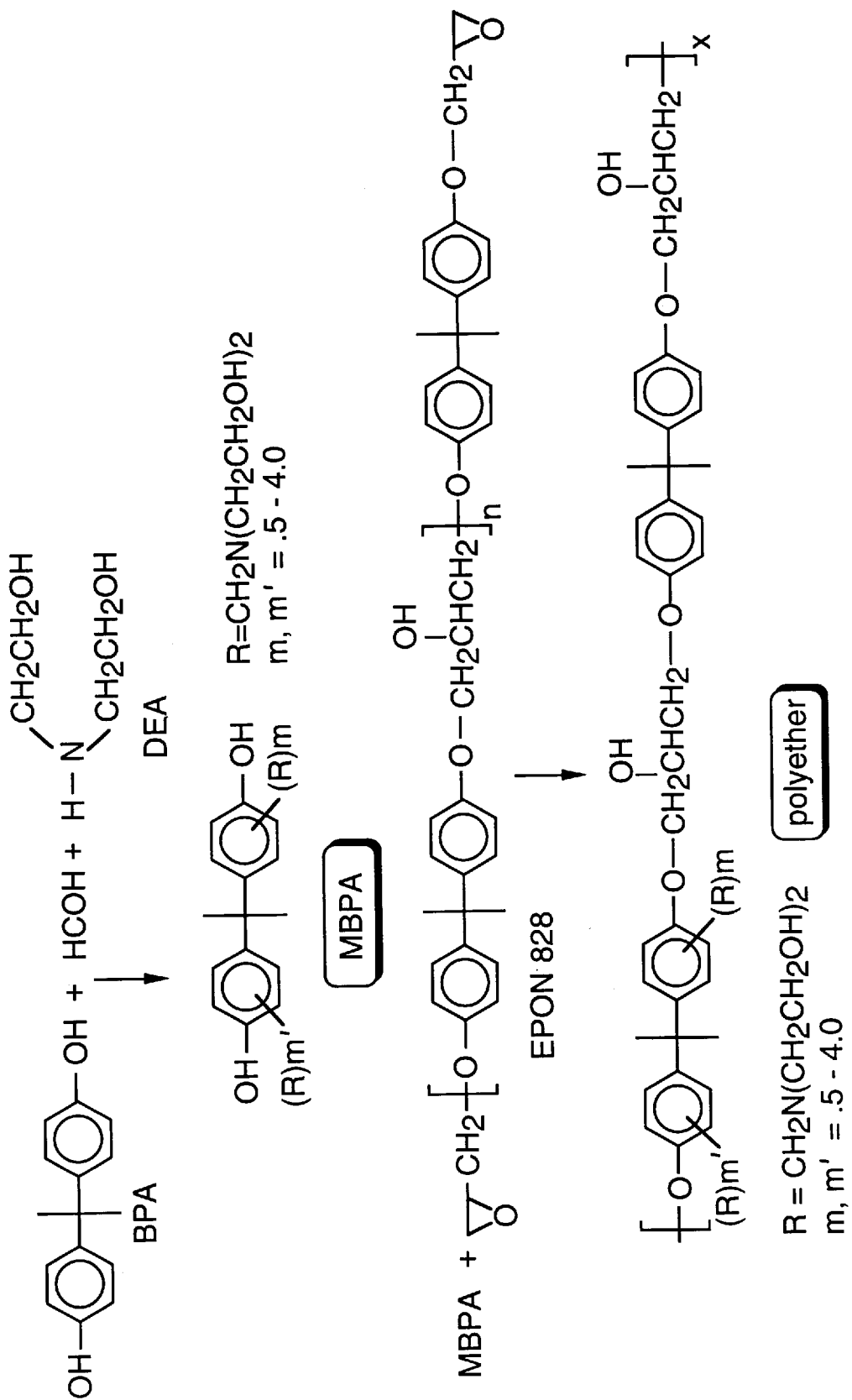
FIG. 1 shows a schematic diagram of the method for preparing a preferred compound used in the methods of the present invention.

The present invention is directed to a method for treating a metal substrate comprising contacting said substrate with an effective amount of a composition comprising: a) a polyether, or an acid salt thereof, having the following formula (1):

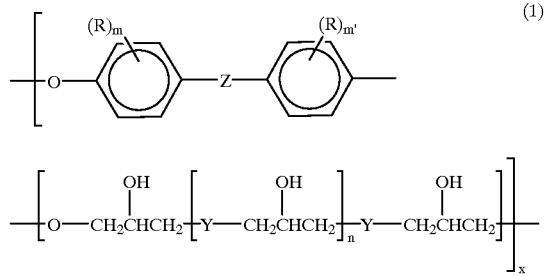

(1)

wherein R is selected from the group consisting of

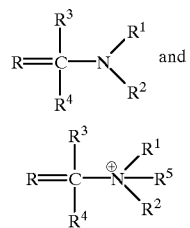

wherein $R^1$ through $R^4$ are independently selected from the group consisting of H, $C_qH_{2q+1}$ and $C_qH_{2q}$—OH; $R^5$ is selected from the group consisting of H, $C_qH_{2q+1}$, —$C_qH_{2q}$—OH, and $C_qH_{2q}$—COOH; q is between about 1 and 18; the sum of m and m' are between about 0.5 and 4.0; n is between about 0 and 3; Z is selected from a straight chain or branched chain divalent aliphatic radical having between about 1 and 3 carbon atoms, $SO_2$, SO or O; Y is

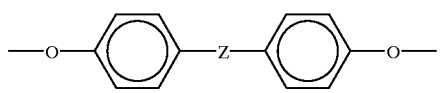

and x is between about 1 and 50; and b) a suitable solvent or mixtures thereof. Preferably, the composition comprises between about 0.01 to about 60% active, based on total composition weight, of component a), more preferably between about 0.01 to about 5% active, based on total composition weight, and most preferably 0.05 to about 1.0% active, based on total composition weight. The present invention is further directed to a method for treating a polymeric substrate with the composition comprising the polyether of formula (1) described above.

One skilled in the art will appreciate that the polyether of formula (1) is the product of the condensation polymerization of a Mannich-derivatized bisphenol resin and a difunctional epoxy. The polyether can be nonionic, but preferably is cationic. The polyether is comprised of alternating hydrophilic and hydrophobic resin components. The water solubility of the compound can therefore be altered by increasing or decreasing the amount of each component. The hydrophilic portion, referred to herein as "Resin A", is generally represented by formula (2):

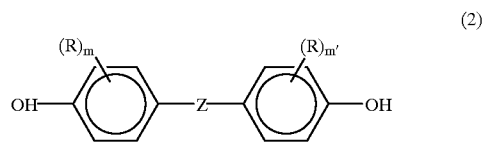

(2)

where "R", "m", "m'" and "Z" are as described above.

The hydrophobic portion, referred to herein as "Resin B", is generally represented by formula (3):

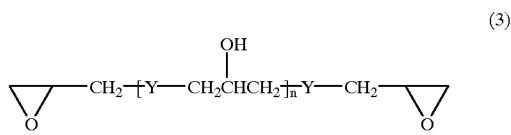

(3)

where "Y" and "n" are as described above.

Resin A is the Mannich-derivatization of a known class of compounds broadly referred to as bisphenols. The bisphenols which can be used in accordance with this invention are generally represented by formula (4):

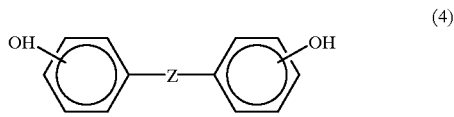

(4)

wherein Z is selected from a straight chain or branched chain divalent aliphatic radical of from 1 to 3 carbon atoms, $SO_2$, SO and O. The preferred bisphenol is bisphenol A (BPA) in which Z is 2,2-propylidene and the two OH groups are in the para position. Other bisphenols which can be used include, but are not limited to, 4,4'-thiodiphenol and 4,4'-sulfonyl diphenol. Bisphenol resins are widely commercially available.

Resin B is a resin having two epoxy groups and is therefore a difunctional epoxy. More specifically, Resin B is a diglycidyl capped prepolymer of bisphenol and epichlorohydrin. As illustrated in formula 3 above, Resin B contains an internal repeating unit that can occur in the resin between 0 and 3 times. The variable "n", therefore, can be between 0 and 3, and preferably is between 0 and 1. The most preferred of these resins is the difunctional bisphenol A-based epoxy resin, where Z is 2,2-propylidene and the two OH groups are in the para position. A preferred diepoxy resin, therefore, is diglycidyl ether of BPA (DGEBPA), which is commercially available from Shell Chemicals, Houston, Tex. in its EPON line of liquid epoxy resins and resin blends. Particularly preferred is EPON® 828, having a molecular weight of between about 370 and 384. Other EPON products having molecular weights ranging between 350 and 1,450 can also be used.

The polyether used in the present invention can be generally represented by the formula $[A-B]_x$, where X refers to the number of repeat units in the polymer and A and B refer to Resin A and Resin B, respectively. X will typically range between about 1 and 50, more preferably between about 1 and 12 and most preferably between about 1 and 4. This generally corresponds with molecular weight ranges of 1,000 to 50,000; 1,000 to 12,000; and 1,000 and 4,000, which are the preferred, more preferred and most preferred molecular weights, respectively, for use in the present invention. A polyether having a molecular weight within the broadest range can be used as long as the polyether remains dispersible or soluble in the desired solvent. Suitable polyethers for use in the present invention are also represented by the general formulas $[A-B-A]_x$ and $[B-A-B]_x$, where X is such that the molecular weight of the resin is as described above. More complex branched structures due to the nature of the condensation reaction and the characteristics of the reactants are also within the scope of the present invention.

It will be appreciated that the $[A-B]_x$ resin generally depicted above represents a repeating unit that characterizes the compound used in the methods of the present invention; no terminating end units are depicted. The end group of the polymers of the present invention not depicted can be selected by the skilled artisan relying upon art-disclosed techniques. For example, the end groups of the polyether may either be those resulting from the specific polymerization process employed or those intentionally added to alter the polymer characteristics. For example, the end groups may be hydrogen, hydroxyl, initiation fragments, chain transfer agents, disproportionation groups, or other similar methods of terminating a growing polymer chain.

The preparation of the polyethers used herein is described in the art in, for example, U.S. Pat. No. 4,001,155. Preferably, the first step is to prepare the Mannich derivative of the bisphenol compounds described above as formula 4. The terms "Mannich derivative" and "Mannich-derivatized" refer to the product which results by reacting a phenolic group, such as a bisphenol, with an aldehyde and an amine. Reactions between a resin, an aldehyde and an amine are referred to as Mannich Reactions, and the methods for performing such reactions are well known to those skilled in the art.

Formaldehyde is typically the preferred aldehyde for use in the Mannich reaction, although any suitable aldehyde can be used.

Similarly, any suitable amine known to those skilled in the art for effecting the Mannich derivatization of a resin can be used, including but not limited to primary amines, secondary amines, alkanol amines, dialkanol amines, and mixtures thereof. An example of a suitable primary amine is monoethanolamine. Suitable secondary alkyl amines which may be used are those of the general formula (5):

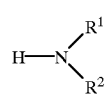

(5)

in which $R_1$ and $R^2$ are the same or different and are selected from the group consisting of H, $C_qH_{2q+1}$, $C_qH_{2q}$—OH, where q is between about 1 and 18.

Methylethanolamine (MEA) and diethanol amine (DEA) are preferred, with DEA being most preferred.

As will be appreciated by those skilled in the art, bisphenols and numerous other resins are generally insoluble in water. Mannich derivatization of the resin serves to improve its solubility in aqueous systems.

The percentage of bisphenol units in the resin which will undergo derivatization during the Mannich Reaction, expressed as the "percent derivatization", can vary. That is, the number of "R" groups attached to each bisphenol molecule can vary from molecule to molecule. Typically, the percent derivatization of the Mannich derivative used in the methods of the present invention, represented in formula 1 by the value of m and m' together, will range from about 0.5 to 4.0, with the range of 2.0 to 3.5 being preferred. It will be understood that the value for either m or m' can equal zero, although the sum of the two must be greater than zero. The water dispersibility and or solubility of the Mannich-derivatized resin will generally increase with percent derivatization. Accordingly, as with the molecular weight, the percent derivatization of repeat units need only be high enough to achieve the desired level of dispersibility or solubility.

As described above, the R groups which attach to the bisphenol resin via the Mannich reaction are generally described by the formula (6):

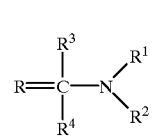

(6)

$R_1$ through $R^4$ can be either the same or different and will vary depending on the amine used in the Mannich reaction. For example, when the amine used in the Mannich reaction is DEA, both $R_1$ and $R^2$ will equal $C_qH_{2q}$—OH, where q equals 2 and $R^3$ and $R^4$ are both hydrogen. Preferably, $R^3$ and $R^4$ are both hydrogen and $R^1$ and $R^2$ are both $C_2H_4OH$. Typically, $R^1$ through $R^4$ will be independently selected from the group consisting of hydrogen, $C_qH_{2q}301$ and $C_qH_{2q}$—OH, wherein q is between about 1 and 18. Preferably, q is between about 1 and 4.

Formula 6 can be further protonized or quaternized to obtain formula (7):

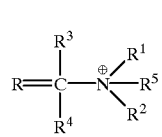

(7)

where $R^5$ is selected from hydrogen, $C_qH_{2q+1}$, $C_qH_{2q}$—OH or $C_qH_{2q}$—COOH, wherein q is between about 1 and 18. Preferably, q is between 1 and 4. Preferably, $R^5$ is selected from the group consisting of —H, —$CH_3$, and —$CH_2CH_2OH$. $R^1$ through $R^4$ are as described above.

The Mannich-derivatized bisphenol (MBP) is then polymerized with the difunctional epoxy "Resin B" to form a polyether. This polymerization is a condensation polymerization, which is described in the Examples and which will be well understood by one skilled in the art.

The polyether is preferably prepared in a suitable solvent. As used herein, the term "suitable solvent" refers to any organic or inorganic solvent, or mixtures thereof, which are capable of dissolving or solubilizing the cationic polyether derivative. Examples would include, but not be limited to, alcohols, ketones, glycol-ether based solvents and mixtures of these solvents. Particularly preferred are ethanol, propylene glycol n-propyl ether, and dipropylene glycol methyl ether.

In a preferred embodiment of the present invention, presented in FIG. 1, BPA is reacted with formaldehyde and DEA to form MBPA. MBPA is then further reacted with DGEBPA to form a polyether represented generally by formula 1.

The Mannich-derivatized resins used in the methods of the present invention will preferably have a molar ratio of BPA:aldehyde:amine ranging between about 1:1:1 to 1:4:4. A ratio giving good results in the present method is 1:3.4:3.6. Mannich-derivatives of bisphenol having a ratio of components within the broadest range will typically be soluble in water, either alone or in their protonized or quaternized form, as more fully described below. The molar ratio of MBP to difunctional epoxy will typically range between about 1:2 and 2:1, with a ratio of 1.5–2.0:1 being preferred.

Although the polyethers used in the methods of this invention are soluble in organic solvents and can be used when dissolved in an organic solvent such as, for example, ethanol, as a practical matter it will be desired to apply the treatment compound from a water solution. To provide the desired water solubility or water dispersibility of the polyether, an organic or inorganic acid can be used for protonization or quaternization of the amine moiety thereof. Useful acids for this purpose include but are not limited to acetic, citric, oxalic, ascorbic, phenylphosphonic, chloromethylphosphonic, mono, di and trichloroacetic, trifluoroacetic, nitric, phosphoric, hydrofluoric, sulfuric, boric, hydrochloric, hexafluorosilicic, hexafluorotitanic, hexafluorozirconic or tetrafluoroboric acids, alone or in combination with each other. Phosphoric acid and acetic acid are preferred. Quaternizing agents include, but are not limited to, methyl chloride, dimethyl sulfate, iodomethane and chloroacetic acid. The addition of water to the protonized or quaternized treatment compounds mentioned above results in a water soluble or water dispersible solution of the polyether derivative useful for metal or polymeric substrate treatment according to the present invention. Use of one or more of the acids listed above will yield the corresponding acid salt of the starting resin. Use of the quaternizing agents will yield the corresponding quaternized species of the starting resin. Generally, only enough of the protonizing or quaternizing compound is added to solubilize the polyether resin.

The pH of the polyether composition can vary from between about 4 to 9. The preferred pH range in terms of both the results achieved and stability of the product is 5 to 7.

It is contemplated that the treatment compositions of the present invention will be used in a working solution at a dilute concentration. Under some circumstances, however, for example transporting or storing the solution, a concentrate of the solution may be preferred. A solution comprising up to 65 weight % based on active ingredient of the treatment composition may be provided. From a commercial point of view, a suitable concentrate of this invention comprises from about 5 weight % to about 65 weight % of the treatment compound.

The present invention is concerned with the application of a treatment solution to a substrate, thereby improving the corrosion resistance and/or paint adhesion characteristics of the substrate. The present invention is particularly concerned with the post-treatment of a metal substrate. As used herein, the term "post-treatment" refers to the treatment of a metal substrate which is not bare metal, for example a metal substrate which has undergone conversion coating. Treatment of metal substrates having a bare metal surface is also within the scope of the present invention. The term "metal substrate", therefore, is used herein to refer to any metal surface, regardless of whether it has undergone conversion coating.

Typical metal substrates include, but are not limited to, zinc and its alloys, aluminum and its alloys, iron, steel, galvanized steel and cold-rolled, ground, pickled and hot-rolled steel.

Although the inventors believe that the methods of the present invention can be effectively employed on any metal substrate, the best results typically will be obtained if the metal substrate has been conversion coated. Processes and solutions for forming conversion coatings on metal surfaces are well known. Processes for applying a phosphate coating are described, for example, in Metals Handbook, Volume II, 8th Edition, pages 531–547 of the American Society for Metals. Different types of conversion coatings are available, depending on such factors as the quality level required, the type of paint or coating to be applied, the application method and the substrate being processed. Examples of conversion coating solutions include, for example, solutions comprising iron phosphate, magnesium phosphate, manganese phosphate, zinc phosphate, zinc phosphate modified with calcium, nickel or magnesium ions, mixed oxide and titanium or zirconium organometallic coatings. It is well within the ordinary skill of one practicing in the art to determine the best or most appropriate conversion coating for use in a given application. It is also within the present invention to incorporate the compositions described herein in the conversion coating formulation. In this manner both the conversion coating and sealing rinse are applied to the substrate simultaneously.

Aside from the treatment of metal substrates, the methods of the present invention can also be employed to treat substrates such as polymeric materials, including but not limited to rubbers and plastics, for example, thermoplastics and thermosets. Treatment of such substrates according to the methods of the present invention is believed to increase the adhesion of paint or other decorative coatings to the substrate, to prevent surface migration of mold-release agents and may improve conductivity for electrostatic painting.

As used herein, the terms "contact" and "contacting" refers to applying the composition used in the methods of the present invention by any conventional method known in the art. For example, the composition can be applied to a surface or substrate by spray coating, roller coating, dipping or immersion. Spray coating is widely employed in the metalworking industry. The temperature of the composition when applied to the substrate can vary over a wide range, but is preferably from 70° F. to 160° F.

As will be understood by one skilled in the art, an effective amount of the polyether composition should be applied to the substrate being treated. As used herein, the term "effective amount" refers to that amount of the present composition needed to impart the desired level of corrosion resistance and/or paint adherence properties to the substrate being treated, or to adequately coat the substrate being treated. For example, contacting each square foot of the substrate to be treated with a composition comprising at least 0.01% active ingredient would typically represent the minimum effective amount for most uses. Preferred effective amounts of the composition have a weight percent active ingredient range of from about 0.01 to 5.

After application of the treatment solution to the substrate, the substrate can optionally be rinsed. Although good results can be obtained without rinsing, it is believed that better results are achieved by rinsing off the residual solution. Typically, the end use will determine whether a rinse is applied at this stage. If rinsing is done, a typical contact time for the composition and substrate before the rinsing step ranges from about 5 seconds to 5 minutes, depending on the substrate being treated and the level of protection desired.

Next, the treated substrate is dried. Drying can be carried out by, for example, circulating air or oven drying. Room temperature drying is typically not as fast as oven drying. It is also believed that oven drying yields better results than air drying, although the inventors do not wish to be bound by this. Oven drying can be effected at a temperature of between about 300 and 400° F. for a period of between about 1 and 15 minutes. Again, the needs of the user can determine which drying technique to employ.

After drying, the substrate is then ready for treatment such as painting, application of adhesive or the like. The substrate is suitable for standard paint or other coating application techniques such as brush painting, spray painting, electrostatic coating, dip, roller coating, as well as electrocoating. As a result of the methods of the present invention, the substrate, for example the metal surface, which is treated has improved corrosion resistance and paint adhesion properties.

As an example of an embodiment representative of the best mode, a Mannich-derivative is prepared via the Mannich Reaction using BPA, formaldehyde and diethanolamine. The MBPA is then polymerized with DGEBPA to form a polyether, which is then treated with phosphoric acid. The composition is then applied to a phosphatized iron surface, rinsed after a contact time of about 2 minutes and dried in an oven at about 300° F. for about 2–3 minutes prior to painting.

EXAMPLES

The following examples are intended to illustrate the invention and should not be construed as limiting the invention in any way.

Example 1—Preparation of Mannich-derivatized Bisphenol A ("MBPA")/EPON Condensate (the "Polyether")

To prepare MBPA, about 289.5 g of Bisphenol A (97%, 1.23 moles) were dissolved in 216.0 g of dipropylene glycol methyl ether, obtained from Arco Chemicals as Arcosolv® DPM, and heated to 80° C. To this solution was added 391.5 g of diethanolamine (99%, 3.73 moles) while the solution was blanketed with a nitrogen stream. While maintaining the nitrogen blanket, 298.5 g of formalin (37% aqueous formaldehyde solution 3.70 moles) was fed into the solution over a 30-minute period. The solution was held at 80° C. with stirring for about 5 hours. The BPA:formaldehyde:diethanolamine ratio was 1:3.0:3.0. To this solution was added 231.8 g of EPON® 828 (0.62 mole). The reaction mixture was stirred at about 80° C. for about 5 hours. The resultant product was diluted into an aqueous solution by adding 198.4 g of 80% phosphoric acid and 3093 g of deionized water and stirring until uniform. The product was an aqueous solution having 20% weight active ingredient and a pH of about 6.5. The polyether had a weight average molecular weight of about 3,000 and a ratio of EPON:MBPA of 1:2. The polyether is referred to "Sample 1" below.

Example 2

The above procedures were repeated to make polymers of different compositions by varying the phenol:formaldehyde:amine, and EPON®:MBPA ratios. In addition, different EPON® resins were employed, as were different neutralizing acids, quaternizing agents and amines. The variations for each of Samples 2–25 are shown in Table 1, below.

TABLE 1

| Sample # | Ratio phenol/ formaldehyde/ amine | Epon Molecular Weight | Epon: MBPA | Molecular Weight* | pH @ 20 wt. % active ingredient | Comments |
|---|---|---|---|---|---|---|
| 2 | 1/1.5/1.5 | 377 | 1/1.1 | | 2.3 | |
| 3 | 1/2.0/2.0 | 377 | 1/1.2 | | 4.0 | |
| 4 | 1/2.0/2.0 | 377 | 1/1.0 | | 5.6 | |
| 5 | 1/2.0/2.0 | 377 | 1/1.0 | 13,000 | 5.5 | |
| 6 | 1/2.0/2.0 | 377 | 1/1.0 | 5,000 | 5.3 | |
| 7 | 1/2.5/2.5 | 348 | 1/1.4 | | 5.2 | |
| 8 | 1/2.5/2.5 | 348 | 1/1.7 | | 5.0 | |
| 9 | 1/2.5/2.5 | 374 | 1/1.0 | 9,000 | 4.3 | |
| 10 | 1/2.6/3.0 | 377 | 1/1.7 | | 6.3 | |
| 11 | 1/2.8/3.0 | 377 | 1/1.7 | | 6.7 | |
| 12 | 1/3.0/3.0 | 348 | 1/1.5 | | 6.0 | |
| 13 | 1/3/3.0 | 377 | 1/1.7 | 4,000 | 5.2 | |
| 14 | 1/3/3.0 | 377 | 1/1.0 | 20,000 | 4.5 | |
| 15 | 1/3/3.0 | 374 | 1/1.0 | 10,000 | 4.5 | |
| 16 | 1/3/3.0 | 374 | 1/1.7 | 7,000 | 5.0 | |
| 17 | 1/3.2/3.0 | 377 | 1/1.0 | | 5.6 | |
| 18 | 1/3.2/3.0 | 377 | 1/1.7 | | 6.6 | |
| 19 | 1/3.4/3.6 | 377 | 1/2.0 | 2,000 | 5.7@ 30% | |
| 20 | 1/3.4/3.6 | 377 | 1/2.0 | 1,700 | 5.7@ 30% | |
| 21 | 1/3/3.0 | 377 | 1/2.0 | | 6.5 | acetic acid |
| 22 | 1/2.0/2.0 | 377 | 1/1.0 | | | acetic acid |
| 23 | 1.0/3.0/3.0 | 377 | 1/1.7 | | 6.2 | MAE instead of DEA |
| 24 | 1/2.8/3.0 | 377 | 1/1.7 | | 2.2 | iodomethane |
| 25 | 1/3.0/3.0 | 377 | 1/1.7 | | 4.0 | APL instead of DEA |

*Molecular weight was not determined for every sample.
MAE = 2-(methylamino)ethanol
APL = 3-amino-1-propanol Example 3

Dilute solutions of the polyether prepared according to Examples 1 and 2 were applied to iron phosphated metal at ambient temperature by either spray or immersion as indicated on Table 2. Cold-rolled steel panels were cleaned with an alkaline cleaner, rinsed, treated with an iron phosphatizer (AC-8225, available from Calgon Corporation, Pittsburgh, Pa.), rinsed, treated with one of the above polyether samples, rinsed and dried. Drying was either at ambient temperature or fast drying, as indicated on Table 2. The alkaline cleaner is a standard product of Calgon Corporation containing caustic sequestrant, water and amphoteric-type wetting surfactant. Product AC-8225 is an iron phosphatizer containing phosphoric acid with inorganic accelerators. Treatment with the polyether samples was either by spraying for about 10–30 seconds or immersion for 2 minutes at ambient temperature. Fast drying was accomplished by placing the panels in a 300° F. oven for 2 minutes.

Following treatment, the panels were painted with Duracron 200 (PPG Industries, Pittsburgh, Pa.) without any primer. Paint thickness was measured in mils. Paint adhesion was determined in accordance with ASTM D3559 "Standard Test Methods for Measuring Adhesion by Tape Test", using test method B. The panels were scribed in the center down to the bare metal, and subsequently subjected to neutral salt spray testing by being placed in a salt spray cabinet containing a 5% aerated sodium chloride solution at 95° F. The salt solution was continually misted into the chamber. The panels were removed from the chamber at about 250 hours, and an air blow was employed to remove loose paint. ASTM rankings and mm readings reflecting the distance from the center of the scribe were determined in accordance with ASTM #B-117 "Standard Test Method for Evaluation of Painted or Coated Specimens Subjected to Corrosive Environments". Results are given in Table 2.

TABLE 2

Performance Test Results

| Sample # | pH@0.25% | ASTM ratings | Paint thickness (mil) | Adhesion | Application method |
|---|---|---|---|---|---|
| 1* | 6.9 | 7 | 1 | 4B | spray |
| 2 | 4.1 | 4 | 1 | 5B | immersion |
| 3 | 5.0 | 5 | 1.1 | 4B | immersion |
| 4 | 5.6 | 6 | 0.9 | 5B | immersion |
| 5 | 5.5 | 6 | 1 | 5B | immersion |
| 6 | 5.3 | 6 | 0.9 | 4B | immersion |
| 7 | 5.6 | 5 | 1.1 | 4B | immersion |
| 8 | 5.3 | 5 | 1.1 | 5B | immersion |
| 9 | 4.3 | 6 | 1 | 5B | immersion |
| 10 | 6.3 | 5 | 0.9 | 4B | immersion |
| 11 | 6.7 | 6 | 0.9 | 5B | immersion |
| 12 | 6.7 | 5 | 1.1 | 5B | immersion |
| 13 | 6.4 | 6 | 0.9 | 4B | immersion |
| 14 | 4.5 | 6 | 1 | 5B | immersion |
| 15 | 4.4 | 5 | 0.9 | 4B | immersion |
| 16 | 5.0 | 5 | 0.9 | 5B | immersion |
| 17 | 5.6 | 5 | 0.9 | 5B | immersion |
| 18 | 6.6 | 5 | 0.9 | 5B | immersion |
| 21 | 6.9 | 6 | 0.9 | 4B | immersion |
| 22 | 4.9 | 6 |  | 4B | immersion |
| 23* | 6.3 | 6 | 1.1 | 5B | immersion |
| 24* | 2.5 | 4 | 1 | 5B | immersion |
| 25* | 3.2 | 5 | 0.9 | 5B | immersion |
| control | no sealing rinse | 4 | 1.0 | 5B |  |

*Panels treated with these samples were fast dried.

The ASTM Ratings presented in Table 2 above correspond with the measurements as presented in Table 3.

TABLE 3

ASTM Ratings

Blister Creepage Ratings Scale (inches)

| Rating | mm from center scribe |
|---|---|
| 10 | 0 |
| 9 | Over 0 to 0.5 |
| 8 | Over 0.5 to 1.0 |
| 7 | Over 1.0 to 2.0 |
| 6 | Over 2.0 to 3.0 |
| 5 | Over 3.0 to 5.0 |
| 4 | Over 5.0 to 7.0 |
| 3 | Over 7.0 to 10.0 |
| 2 | Over 10.0 to 13.0 |
| 1 | Over 13.0 to 16.0 |
| 0 | Over 16.0 to more |

Example 4

The methods of Example 3 were repeated using various application conditions of the polymer. A range of concentrations, drying temperatures and different neutralization acids were employed. Treatment and panels were as described in Example 3 and as illustrated in Table 4 below.

TABLE 4

Application Concentrations and Drying Temperatures

| Sample # | Acid | Active % | pH of solution | Drying temp | ASTM rating at 250 hours | Adhesion |
|---|---|---|---|---|---|---|
| 22 | phosphoric | 0.05 | 5.2 | 300° F. | 5 | 4B |
|  |  |  |  | ambient | 6 | 4B |
|  |  | 0.25 | 5.2 | 300° F. | 6 | 4B |
|  |  |  |  | ambient | 5 | 4B |
|  |  | 0.50 | 5.1 | 300° F. | 5 | 4B |
|  |  |  |  | ambient | 5 | 4B |
|  | acetic | 0.05 | 4.9 | 300° F. | 5 | 4B |
|  |  |  |  | ambient | 5 | 4B |
|  |  | 0.25 | 4.8 | 300° F. | 6 | 4B |
|  |  |  |  | ambient | 6 | 4B |
|  |  | 0.50 | 4.8 | 300 | 5 | 4B |
|  |  |  |  | ambient | 5 | 4B |
| control | no sealing rinse |  |  |  | 4 | 5B |

As can be seen in Table 4, the ASTM rating using varying drying temperatures, pH, and acids were all higher with the polyethers of the present invention than with the control panel.

Example 5

The methods above were repeated to compare panels rinsed after phosphatizing and not rinsed after phosphatizing. Two types of panels were used, Bonderite® 1000 panels and AC-8225 panels. The AC-8225 panels are those described in Example 3. The Bonderite® 1000 panels are prepared phosphated panels commercially available from ACT Laboratories, Hillside, Mich.

TABLE 5

| Sample # | Rinse | Metallurgy | ASTM Rating at 250 Hours |
|---|---|---|---|
| 1 | yes | B1000 | 8 |
|  |  | AC-8225 | 7 |
|  | no | B1000 | 6 |
|  |  | AC-8225 | 6 |
| control | no sealing rinse |  | 4 |

As can be seen in Table 5, the rinsed panels gave better results than the non-rinsed panels, although the non-rinsed panels still had better performance than control panels. Performance on the B1000 panels and AC-8225 was about the same.

Whereas particular embodiments of this invention have been described above for purposes of illustration, it will be evident to those skilled in the art that numerous variations of the details of the present invention may be made without departing from the invention as defined in the appended claims.

What is claimed is:

1. A method for treating a substrate comprising contacting said substrate with a composition comprising: a) a polyether derivative, or an acid salt thereof, having the following general formula (1):

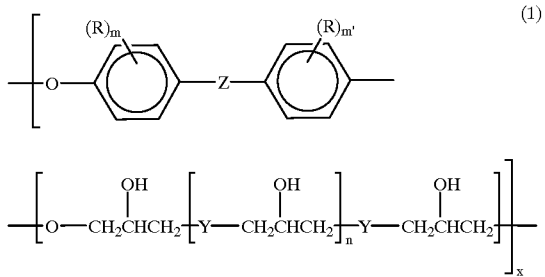

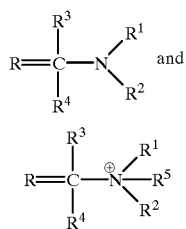

wherein R is selected from the group consisting of

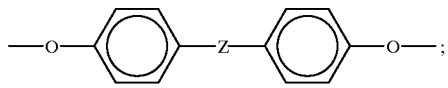

wherein $R^1$ through $R^4$ are independently selected from the group consisting of H, $C_qH_{2q+1}$ and $C_qH_{2q}$—OH; $R^5$ is selected from the group consisting of H, $C_qH_{2q}+1$, $C_qH_{2q}$—OH and $C_qH_{2q}$—COOH; q is between about 1 and 18; the sum of m and m' are between about 0.5 to 4.0; n is between about 0 and 3; Y is Z is selected from the group consisting of a straight chain or branched chain divalent aliphatic radical having between about 1 and 3 carbon atoms, $SO_2$, SO and O; and X is between about 1 and 50; and b) a solvent or mixtures thereof.

2. The method of claim 1, wherein said substrate is metal.

3. The method of claim 2, wherein said metal substrate is a phosphate-type conversion coated metal surface.

4. The method of claim 1, wherein said substrate is a polymeric material.

5. The method of claim 4, wherein said polymeric material is selected from the group consisting of rubber, thermoplastics and thermosets.

6. The method of claim 1, wherein said contact time is between about 5 seconds and 5 minutes.

7. The method of claim 6, wherein said contact time is between about 30 seconds and two minutes.

8. The method of claim 1, wherein m and m' together equal between about 3.3 and 3.5.

9. The method of claim 8, wherein

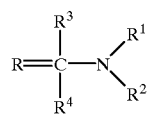

$R^3$ and $R^4$ are both hydrogen; and $R^1$ and $R^2$ are both $C_2H_4OH$.

10. The method of claim 9, wherein n is between about 0 and 1.

11. The method of claim 10, wherein Z is 2,2-propylidene.

12. The method of claim 1, wherein the molecular weight of said composition is between about 1,000 and 50,000.

13. The method of claim 12, wherein the molecular weight of said composition is between about 1,000 and 4,000.

14. The method of claim 1, wherein $R^5$ is selected from the group consisting of —H, —$CH_3$, —$CH_2CH_2OH$, and $CH_2COOH$.

15. The method of claim 1, wherein the phenol:aldehyde:amine ratio is between about 1:1:1 and 1:4:4 and the diepoxy resin to Mannich derivatized phenol ratio is about 1:2 and 2:1.

16. The method of claim 15, wherein the ratio of phenol:aldehyde amine is about 1:3.4:3.6 and the ratio of diepoxy resin to Mannich derivatized phenol is between about 1:1.5 and 1:2.0.

17. The method of claim 1, wherein said contact between said substrate and said composition is accomplished by spraying, and said contact time is between about 30 seconds and 90 seconds.

18. The method of claim 1, wherein said contact between said substrate and said composition is accomplished by immersion, and said contact time is between about one minute and two minutes.

19. A method for treating a substrate comprising the steps of
a) coating said substrate with a phosphatizer;
b) contacting the substrate of step a with a polyether derivative, or acid salt thereof, having the following general formula (1):

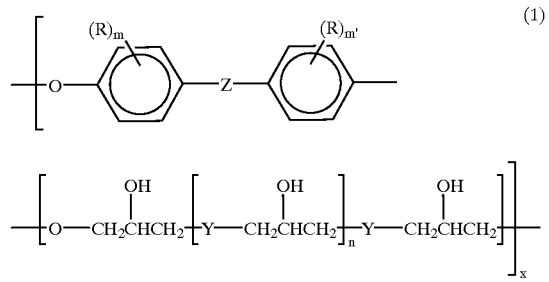

wherein R is selected from the group consisting of

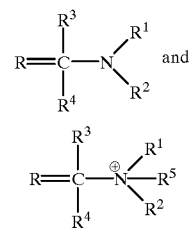

wherein $R^1$ through $R^4$ are independently selected from the group consisting of H, $C_qH_{2q+1}$ and $C_qH_{2q}$—OH; $R^5$ is selected from the group consisting of H, $C_qH_{2q+1}$, $C_qH_{2q}$—OH and $C_qH_{2q}$—COOH; q is between about 1 and 18; the sum of m and m' are between about 0.5 to 4.0; n is between about 0 and 3; Y is

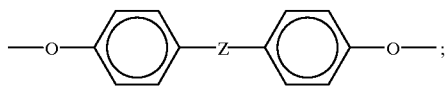

Z is selected from the group consisting of a straight chain or branched chain divalent aliphatic radical having between about 1 and 3 carbon atoms, $SO_2$, SO and O; and X is between about 1 and 50 in a solvent or mixture of solvents;

c) drying the substrate of step b); and d) painting the substrate of step c).

20. The method of claim 19, further comprising the step of rinsing the substrate between steps a) and b).

21. The method of claim 19, further comprising the step of rinsing the substrate between steps b) and c).

22. The method of claim 20, further comprising the step of rinsing the substrate between steps b) and c).

23. The method of claim 1, wherein said composition is added to a conversion coating formulation prior to contact with the substrate.

* * * * *

UNITED STATES PATENT AND TRADEMARK OFFICE
CERTIFICATE OF CORRECTION

PATENT NO. : 5,972,433

DATED : October 26, 1999

INVENTOR(S) : Shih-Ruey Thomas Chen et al.

It is certified that errors appear in the above-identified patent and that said Letters Patent should be corrected as shown below:

Col. 6, line 41, the formula "$C_q H_{2q}3O1$" should read — $C_qH_{2q+1}$ — as originally submitted.
Col. 6, line 50, the symbol " + " should be ⊕ as originally submitted.

Signed and Sealed this

Third Day of April, 2001

Attest:

NICHOLAS P. GODICI

Attesting Officer   Acting Director of the United States Patent and Trademark Office